United States Patent
Kilker

[11] Patent Number: 5,847,519
[45] Date of Patent: Dec. 8, 1998

[54] MULTI-FUNCTIONAL APPARATUS FOR A WIPER AND CABLE DRIVE

[75] Inventor: Daniel D. Kilker, Freeport, Ill.

[73] Assignee: UT Automotive Dearborn, Inc., Dearborn, Mich.

[21] Appl. No.: 947,977

[22] Filed: Oct. 9, 1997

[51] Int. Cl.⁶ .............................. B60S 1/58; F16H 37/12; G05G 9/00

[52] U.S. Cl. ...................... 318/14; 318/15; 318/DIG. 2; 74/665 F; 292/DIG. 23

[58] Field of Search ................................... 318/9, 14, 15, 318/443, 444, DIG. 2; 74/665 R, 665 F; 15/250.001, 250.16, 250.17; 307/9.1, 10.1; 292/DIG. 23, DIG. 25

[56] References Cited

U.S. PATENT DOCUMENTS

| | | |
|---|---|---|
| 2,271,207 | 1/1942 | Rhein . |
| 2,615,945 | 10/1952 | Jaeschke . |
| 2,659,237 | 11/1953 | Wood . |
| 2,722,617 | 11/1955 | Cluwen et al. . |
| 2,959,803 | 11/1960 | Ziegler . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |

(List continued on next page.)

FOREIGN PATENT DOCUMENTS

| | | |
|---|---|---|
| 0 345 002 A2 | 6/1989 | European Pat. Off. . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| 2 153 218 | 8/1985 | United Kingdom . |
| WO 86/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), 11 Sep. 1992 for JP Patent Publication No. 04151351.

P. 100, *Machine Design*, 60 (1988) Oct. 13, No. 24, Cleveland, Ohio, US.

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms", 1959, J.E. Shigley, pp. 228–231.

(List continued on next page.)

*Primary Examiner*—Bentsu Ro
*Attorney, Agent, or Firm*—Harness, Dickey & Pierce, P.L.C.

[57] ABSTRACT

Disclosed is a multi-functional apparatus having a single electromagnetic device to drive a multiple of electrically-actuated functions. The multi-functional apparatus has an armature shaft that selectively and alternatively activates a window wiper assembly and a flexible, elongated drive element such as a cable coupled to opposing ends of the armature shaft.

9 Claims, 3 Drawing Sheets

U.S. PATENT DOCUMENTS

| | | |
|---|---|---|
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,702,117 | 10/1987 | Tsutsumi et al. . |
| 4,733,147 | 3/1988 | Muller et al. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,103,691 | 4/1992 | Periou ........................ 74/665 GD |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint et al. . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,691,586 | 11/1997 | Yonnet et al. . |
| 5,694,812 | 12/1997 | Maue et al. . |
| 5,764,010 | 6/1998 | Maue et al. ........................ 318/443 |

OTHER PUBLICATIONS

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article Mechanical Systems.

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, "Mechanisms for Intermittent Motion, Part 2", Jan. 1952, Otto Lichtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechansms, "Designing for Intermittent Motion with Modified Starwheels", Karl E. Kist, pp. 16–20.

"Mechanisms for Engineering Design" Motion, Circular, Intermttent, Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

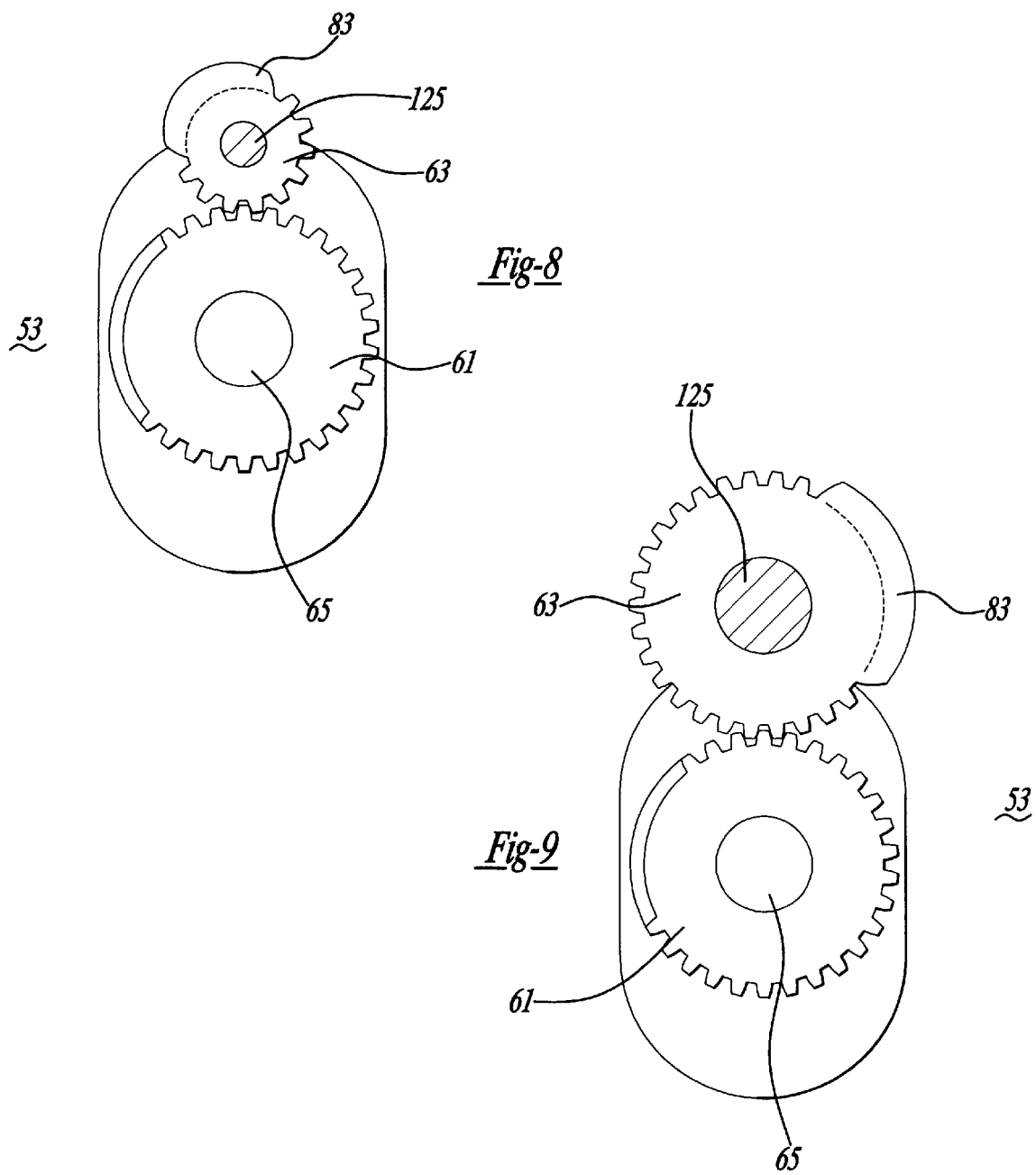

MULTI-FUNCTIONAL APPARATUS FOR A WIPER AND CABLE DRIVE

BACKGROUND OF THE INVENTION

This invention relates generally to control systems for automobiles and in particular to a method and an apparatus that uses a single electrical motor to perform a plurality of alternative tasks.

Motor vehicles commonly include a number of features that rely upon small electrical motors for their operation. For example, almost all automotive vehicles have window wiper assemblies driven by electrical motors, often for both front and rear windows. Window washer systems that include a pump to deliver cleaning fluid to the surface of a window are also common. It is further known to provide a wiper system in combination with a wash device to clean headlamps of automotive vehicles. Other examples of features that involve electric motors and solenoids include automatic door locks, window latches, for example for pivoting liftgates of minivans, station wagons, sport-utility vehicles, antenna retraction mechanisms, headlamp cover retraction mechanisms, fuel filler door locks, and so on.

It is common to employ a window wiper assembly for cleaning rear windows of automotive vehicles. Typically, these types of rear window wiper assemblies include a wiper blade mounted upon a bracket that is coupled to a wiper arm. The wiper arm is attached to a wiper shaft rotatably driven in a cyclical oscillating manner by a helical gear. A reversible, fractional horsepower dc electric motor actuates the helical gear through a worm gear mounted on then armature shaft. The rear window wiper may be mounted on a pivoting liftgate. Examples of such window wiper assemblies and motor mechanisms are described in Isii, U.S. Pat. No. 4,893,039 (issued Jan. 9, 1990); Heinrich, U.S. Pat. No. 4,878,398 (issued Nov. 7,1989); Goertler et al., U.S. Pat. No. 14,336,482 (issued Jun. 22, 1982); Seibicke, U.S. Pat. No. 4,259,624 (issued Mar. 31, 1981); Schneider et al., U.S. Pat. No. 4,259,624 (issued Sep. 26, 1972); and Beard et al., U.S. Pat. No. 3,665,772 (issued May 30, 1972), all of which are incorporated herein by reference.

Vehicles with liftgates conventionally provide a rear window release lock or latch that is actuated by a solenoid and may be unlocked to allow for upward pivotal movement of the rear window in relation to the otherwise stationary liftgate. A separate liftgate lock is often mounted on the liftgate door for fastening the liftgate to the body to prevent inadvertent pivotal opening. This lift gate lock may be operated manually with a key or handle rotation or may operate with an electric motor or solenoid.

Using separate motors and solenoids to actuate the various electrically-driven and automatic features such as the ones described above presents a number of difficulties. The use of multiple electromagnetic devices increases the automotive vehicle weight and cost. Not only is the piece cost increased when a multiplicity of electromagnetic devices are used, but the assembly cost, part number proliferation and handling costs, electrical wiring costs, objectionable motor noise, and failure modes are increased. In addition, it is often difficult to place multiple devices within the small space available. The problems of added weight and small spaces are particularly acute in the case of pivoting liftgates when two or more motorized mechanisms such as a window wiper mechanism, a window wash pump, a rear window latch, and a liftgate lock are incorporated within the liftgate.

Multi-functional apparatuses that employ a single electromagnetic device to control more than one device or function such as window wiper, liftgate lock, and liftgate window release lock, are disclosed in U.S. Patent Applications Maue et al., 08/431,148; Maue et al., 08/431,149; and Zimmer et al., 08/430,388, all of which are incorporated herein by reference. A need remains, however, for simpler and more flexible means for controlling multiple electrically-driven functions in small spaces using a single electromagnetic device for minimal weight and space requirements.

SUMMARY OF THE INVENTION

In accordance with the present invention, the preferred embodiment of a multi-functional apparatus, an electromagnetic device having an armature shaft that selectively and alternatively activates a window wiper assembly and a flexible, elongated drive element such as a cable coupled to opposing ends of the armature shaft.

In another aspect of the invention, the window wiper assembly is coupled to the electromagnetic device through first and second rotatable members. The electromagnetic device drives the second rotatable member. The first rotatable member is engaged and rotated by the second rotatable member during a portion of at least about 1 degree but less than all of the degrees of a rotation of the second rotatable member. The first rotatable member has a passive slide that prevents rotation of the first rotatable member during the remaining portion of the rotation of second rotatable member. The first rotatable member drives the window wiper assembly. In the preferred embodiment, the flexible, elongated drive element of the apparatus is rotated by the electromagnetic device at a time when the first rotatable member is stationary.

The multi-functional apparatus of the present invention offers the advantages over conventional systems of combining multiple functions into a single apparatus that is both lighter and occupies less space than separate controllers for such functions. For example, the present invention may replace traditional separate rear wiper motor, liftgate lock/unlock motor, rear window unlock solenoid, and window washer pump motor. Moreover, the multi-functional apparatus of the invention offers the advantage over previous such devices of being simpler and, particularly for embodiments including a substantially torsionally static, longitudinally flexible cable, offering improved flexibility in positioning of a single motor relative to the multiple of mechanical devices that are driven by the motor.

Additional advantages and features of the present invention will become apparent from the following description and appended claims, taken in conjunction with the accompanying drawings.

BRIEF DESCRIPTION OF THE DRAWINGS

FIG. 8 is a diagrammatic view, taken along line 8—8 of FIG. 3, showing the first preferred embodiment; and FIG. 9 is a diagrammatic view, taken along line 8—8 of FIG. 3, of a second preferred embodiment of the present ivention of a multi-functional apparatus for a wiper and a cable drive.

DETAILED DESCRIPTION OF THE PREFERRED EMBODIMENT

Figure 1:
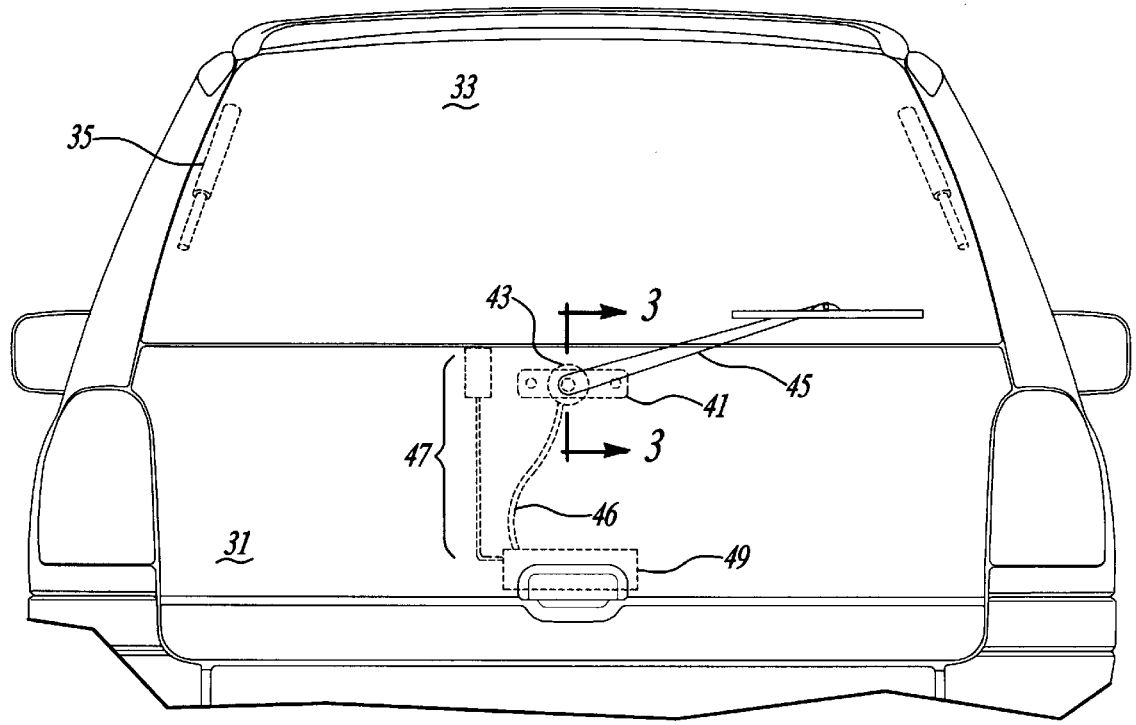
FIG. 1 is a rear elevational view showing a first preferred embodiment of a multi-functional apparatus for a wiper and a cable drive of the present invention.

An automotive vehicle, such as a minivan or the like, has a rear liftgate door that can pivot about an upper pair of hinges coupled to the vehicle body structure. When the liftgate is pivoted to an open position, a cargo space is accessible from behind the vehicle. Such a liftgate is shown in FIG. 1. Liftgate 31 has a rear window or backlite 33 pivotable between a closed position, substantially flush with the outer surface of liftgate 31, to an open position about upper hinges. A pair of pneumatic cylinders 35 act to push window 33 toward the open position when a lower portion of window 33 is released. The preferred embodiment of a multifunctional apparatus 41 of the present invention is mounted upon an inner surface of liftgate 31. The majority of apparatus 41 is hidden by an interior trim panel (not shown).

Apparatus 41 includes a central drive and power transmission device 43, a window wiper assembly 45, a torsionally static, longitudinally flexible cable 46, a window release latch or lock linkage 47 and a liftgate lock 49, all of which are mounted upon liftgate 31. Examples of such locks, which would be used in the present invention by removing separate solenoids or motors and coupling the lock mechanism into the multi-functional apparatus of the present invention, are disclosed by Kato, U.S. Pat. No. 5,222,775; Slavin et al., U.S. Pat. No. 4,422,522; and Quantz, U.S. Pat. No. 3,917,330, all of which are incorporated herein by reference.

In an especially preferred embodiment, the flexible, elongated drive element is a substantially torsionally static, longitudinally flexible cable. The term "torsionally static" as used herein refers to a cable for which a rotational force applied to one end to rotate that end of the cable a given number of degrees pcoreuces a corresponding rotation of the other end of the cable of substantially the same number of degrees. Torsionally static cables are known and are employed for various uses such as for speedometer cables.

Figure 2:
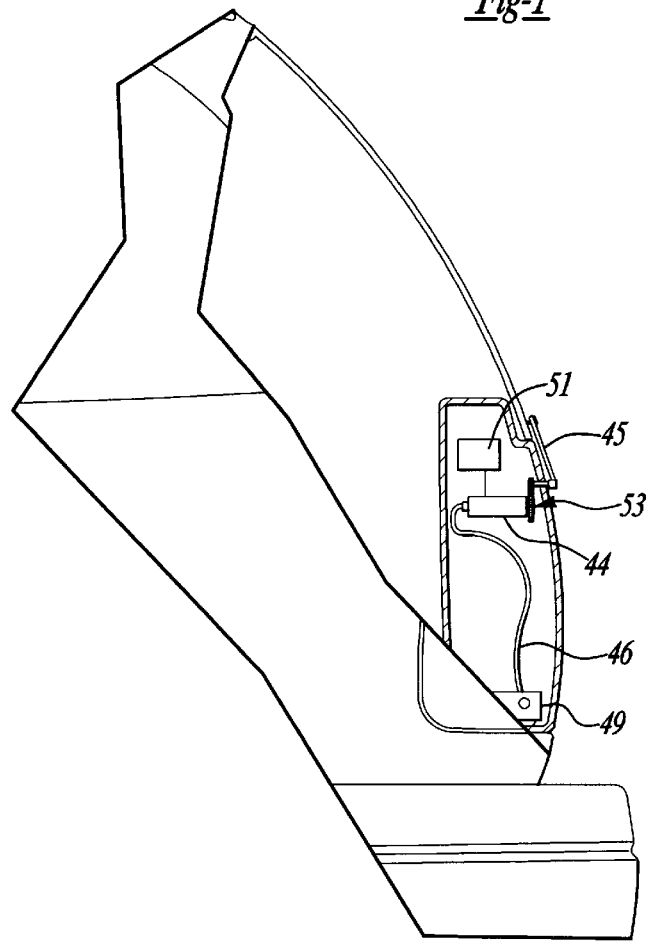
FIG. 2 is side elevational view, partially in section, showing the first preferred embodiment of a multi-functional apparatus for a wiper and a cable drive of the present invention.

FIG. 2 illustrates placement of the multi-functional apparatus in a side perspective view of a preferred embodiment. An electronic control unit or microprocessor 51 is mounted upon a rigid printed circuit board mounted to central drive and power transmission unit 43. A preferred embodiment of the microprocessor is described in Maue et al., U.S. application Ser. No. 08/431,149, incorporated herein by reference. Microprocessor 51 controls operation of an electromagnetic device 44. Window wiper assembly 45 is coupled to electromagnetic device 44 through rotationally interactive, passive slide-modified coupling 53. (The passive slide modification is shown in detail in FIGS. 8 and 9, described below). Coupling 53 and flexible cable 46 are located at either end of electromagnetic device 44. Flexible cable 46 links the electromagnetic device 44 to both window release latch or lock linkage 47 and liftgate lock 49.

Figure 3:
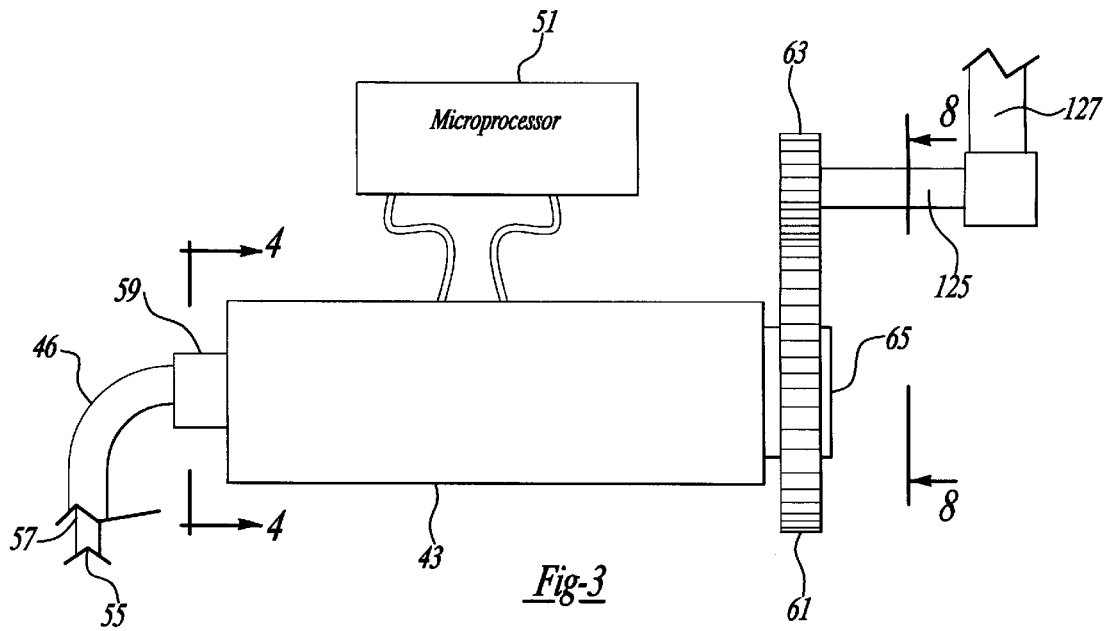
FIG. 3 is a side elevational view of the first preferred embodiment of a multi-functional apparatus for a wiper and a cable drive of the present invention.

FIG. 3 illustrates the construction of central drive and power transmission unit 43. Electromagnetic device 44 is preferably an electric motor, which is of a conventional 12-volt fractional horsepower, dc electromagnetic variety. Electric motor 44 operably rotates an armature shaft 65 having portions that extend beyond the motor at both ends. Microprocessor 51 is electrically connected to electric motor 44 and serves to control the operation of motor 44 and rotation of armature shaft 65.

At a first end of armature shaft 65, a housing 59 is provided for receiving a prepared end of torsionally static, longitudinally flexible cable 46. Flexible cable 46 comprises a square- or round-shaped metal wire or core 55, preferably a steel core, that is freely placed inside of a spiraled or articulated flexible metal sleeve 57. Flexible metal sleeve 57 is coated on its exterior with a layer of rubber or plastic (not shown) that serves to prevent moisture or other environmental contaminants from contacting the metal of flexible metal sleeve 57 or metal wire or core 55. Although many metals would be suitable for wire or core 55 and metal sleeve 57, steel, particularly a low carbon alloy such as 1010 steel, is preferred. The rubber or plastic coating is selected to be durable under the expected service conditions. For automotive applications, a rubber or plastic coating that is can withstand temperatures of from about −40° C. to about 40° C. without cracking or deforming would be desirable.

Armature shaft 65 is connected at the opposite end to rotationally interactive, passive slide-modified coupling 53 having a first rotatable member 63 and a second rotatable member 61. Although other means of connection are contemplated, such as by brazing or welding second rotatable member 61 of coupling 53 onto the end of armature shaft 65, in a preferred embodiment armature shaft 65 is fitted into an inner, central opening of second rotatable member 61. Armature shaft 65 may be fitted into second rotatable member 61 by different means, including press fit or by securing with a pin. In a particularly preferred embodiment, a heat-treated, knurled armature shaft 65 is pressed and cut into an inner central opening of second rotatable member 61. It is especially preferred to taper the knurled armature shaft 65 for a very good press fit.

Second rotatable member 61 is adjacent to first rotatable member 63, the rotatable members being arranged so that first rotatable member 63 is engaged and rotated by second rotatable member 61 during a portion of a rotation of second rotatable member 61, the portion being preferably at least about 1 degree but less than all of the degrees of a rotation of second rotatable member 61. First rotatable member 63 has a passive slide that prevents rotation of the first rotatable member 63 during the remaining portion of a rotation of second rotatable member 61. Core 55 of flexible cable 46 is rotated by electromagnetic device 44 at a time when first rotatable member 63 is stationary. First rotatable member 63 has a window wiper shaft 125 extending outward for rotating in concert with first rotatable member 63. A window wiper arm 127 of wiper assembly 45 is mounted onto wiper shaft 125 in a conventional manner. Wiper shaft 125 is preferably made of cold rolled steel and may be painted. The multi-functional apparatus may oscillate wiper assembly 45 at a desired number of cycles per minute round trip, for instance forty-five cycles per minute. First and second rotatable members 63 and 61 may be metallic or nonmetallic gears. Suitable materials include, without limitation, steel, brass, or a nylon, such as nylon-6,6. If nonmetallic materials are used, the material should be non-deformable at temperatures of up to about 71° C. (180° F.). One preferred material is sold under the tradename DELRIN by DuPont, Wilmington, Del.

Although the invention is illustrated by reference to a preferred embodiment in which the device of the invention is connected to and controls the functions of a window wiper assembly, a window release latch, and a liftgate lock, the invention encompasses other combinations that may include couplings of an electromagnetic device through the flexible cable or through the rotationally interactive, passive slide-modified coupling to various mechanical devices that may be designed to move gears, actuate levers, push buttons, activate electronic switches, run pumps, and so on. For example, and without limitation, the multi-functional apparatus of the invention may activate and control any combination of two or more devices selected from window wiper assemblies; headlamp wiper systems; washer systems that include a pump to deliver cleaning fluid to a surface such as a window or a headlamp; door locks; hood or trunk latches; window latches, such as those of pivoting liftgates of minivans, station wagons, sport-utility vehicles; power window assemblies; antenna retraction mechanisms; headlamp cover retraction mechanisms; fuel filler door locks, and so on.

The operation of the multi-functional apparatus of the present invention can best be understood by referring to FIGS. 4–9. FIGS. 4–7 illustrate operation of a preferred embodiment of the connection of the core 55 of the flexible cable 46 to the armature shaft 65. FIGS. 8 and 9 illustrate the rotationally interactive, passive slide-modified coupling 53.

Figure 4:
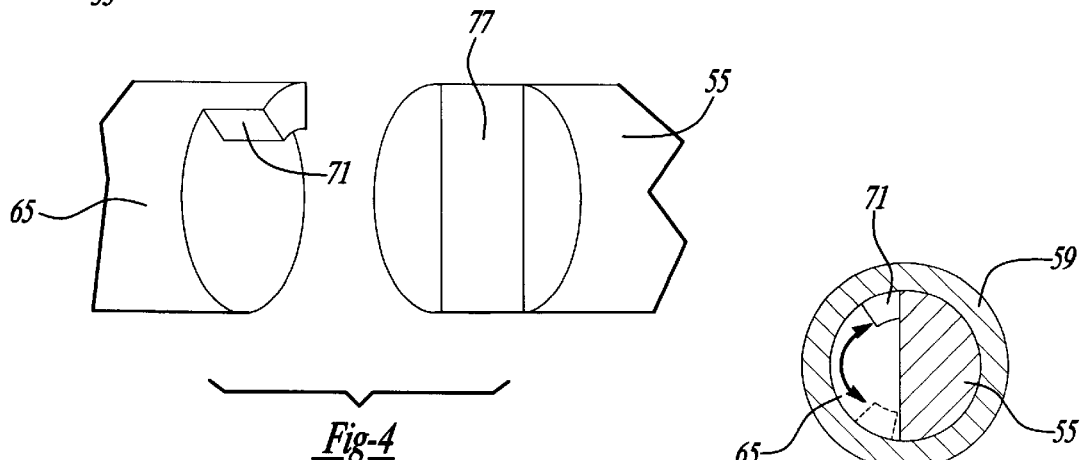
FIGS. 4, 5, and 6 are cross-sectional views, taken along line 4—4 of FIG. 3, showing the first preferred embodiment of the present invention of a multifunctional apparatus for a wiper and a cable drive in three different positions.

FIG. 4 shows the ends of armature shaft 65 and flexible cable 65 that meet within housing 59. Armature shaft 65 has tab 71 that rotatably engages notched end 77 of core 55 during a portion of rotation of armature shaft 65. When tab 71 is rotated in the area that has been notched out of core 55, however, core 55 is not engaged and does not rotate. While tab 71 and notched end 77 are shown in preferred geometries of a tab on the outer portion of the face of armature shaft 65 and a half-cylinder notch on the end of core 55, different geometries are operable and within the scope of the invention. For instance, notched end 77 could likewise be a tab and tab 71 could be wider or extend to the center of the end of armature shaft 65. The geometries for a specific application of the invention should be chosen to allow engagement and rotation of notched end 77 for a desired rotational displacement of core 55 and for non-engagement for a sufficient portion of rotation of armature shaft 65 to allow for a desired alternative operation of the wiper drive on the other end of armature shaft 65.

Figure 5:
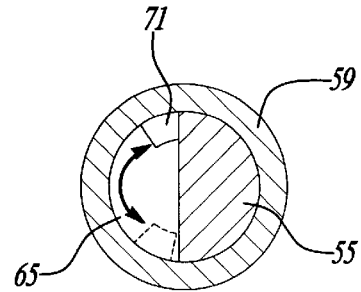
Figure 6:
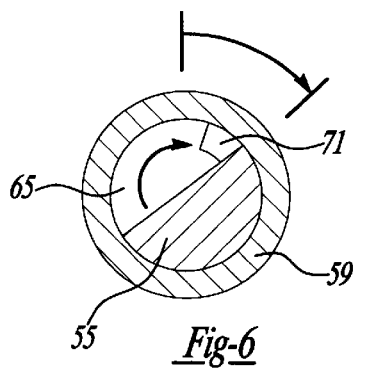
Figure 7:
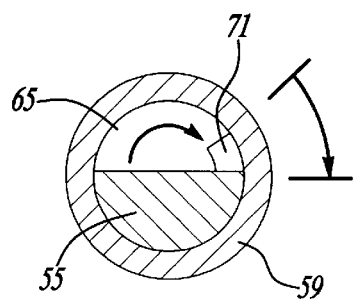
FIG. 7 is a fragmentary, exploded perspective view showing the ends of engaging parts employed in the first preferred embodiment of a multi-functional apparatus for a wiper and a cable drive of the present invention.

FIGS. 5–7 illustrate alternative operations of the multi-functional apparatus. In FIG. 5, armature shaft 65 rotates tab 71 between the indicated positions. Notched end 77 is not moved. While tab 71 is moved back and forth between the indicated outer positions, armature shaft 65 actuates the wiper assembly connected to the other end of armature shaft 65 to sweep a window wiper back and forth along the window. In FIG. 6, tab 71 engages notched end 77 to rotate core 55 to a first position. During the rotation of core 55 to the first position, the other end of core 55 engages and actuates liftgate lock 49 to unlock the liftgate. During the rotation of core 55, the second rotatable member 61 of coupling 53 is sliding against the passive slide of the first rotatable member 63, leaving the first rotatable member stationary. In FIG. 7, tab 71 rotates notched end 77 and core 55 further to a second position. During the rotation of core 55 to the second position, the other end of core 55 engages and actuates window release latch 47 to release the window of the liftgate. During this further rotation of core 55 the the first rotatable member, and the attached wiper assembly, again remain stationary.

Rotationally interactive, passive slide-modified coupling 53 is illustrated in first and second preferred embodiments by FIGS. 8 and 9. Armature shaft 65 is shown centrally connected to second rotatable member 61. A portion of the circumference of second rotatable member 61 is toothless. A passive slide 83 is a protuberance projecting from first rotatable member 63. Rotatable members 61 and 63 are engaged while the toothed portions of their respective circumferences are in contact. During the period of engagement, rotation of first rotatable member 63 in turn rotates wiper shaft 125. When the passive slide 83 of first rotatable member 63 contact second rotatable member 61 at the part of the circumference with no teeth, however, the second rotatable member 61 slides against passive slide 83 without rotatably engaging first rotatable member 63. Thus, during this time the window wiper assembly is not activated. As can be seen from the operation of coupling 53, first and second rotatable members 63 and 61 may be any generally cylindrical solid, for example gears or drums.

The degrees of rotation of armature shaft 65 to actuate the flexible cable 46 at one end or to engage the first rotatable member 63 at the other end depend upon the gear ratios, or relative circumferences, of the rotatable members 61 and 63 and upon the degrees of rotation of the core 55 of the flexible cable 46 required to activate the selected mechanisms. The particular geometries may be optimized by the skilled artisan by straightforward testing.

The wipe motion is performed by reversing the motor. The gears have a passive stop to allow for parking and locking the wiper blade in the park position. The other functions, the functions actuated by rotation of the cable, are performed with the wiper in the park position. The cable functions are performed by running the motor in the opposite direction. The first pass in wipe mode will reset the cable functions.

Various materials have been disclosed in an exemplary fashion, however, other materials may of course be employed. It is intended by the following claims to cover these and any other departures from the disclosed embodiments which fall within the true spirit of this invention.

The invention claimed is:

1. A multi-functional apparatus comprising:

an electromagnetic device having an armature shaft;

a first intermittent rotary motion mechanism having a driven interfacing surface, a first end of said armature shaft engagable with the first intermittent rotary motion mechanism during a first portion of a rotation positional range of said armature shaft;

a second intermittent rotary motion mechanism having a driven interfacing surface; and a second end of said armature shaft engagable with said second intermittent rotary motion mechanism during a second portion of the rotation positional range of said armature shaft.

2. A multi-functional apparatus according to claim 1, wherein said first intermittent rotary motion mechanism includes a substantially torsionally static and longitudinally flexible cable, said second intermittent rotary motion mechanism includes a rotationally interactive coupling with a passive slide.

3. A multi-functional apparatus according to claim 2, wherein said first and second intermittent rotary motion mechanism are alternatively engaged.

4. A multi-functional apparatus according to claim 3, wherein said coupling includes a first rotatable member rotatable having a driven interfacing surface;

a second rotatable member engagable with said first rotatable member during a portion of a rotation positional range of said first rotatable member, said second rotatable member having a protuberance along a circumference of said second rotatable member preventing rotation during a remaining rotation positional range of said first rotatable member.

5. A multi-functional apparatus according to claim 4, further comprising:

a wiper output shaft rotating in concert with the first rotatable member; and a wiper gear coupled to said wiper output shaft for supplying oscillating pivotal movement thereto.

6. A multi-functional apparatus according to claim 2, further including at least one lock coupling member movable between a locked orientation and an unlocked orientation by contacting with a driving surface of said flexible cable.

7. A multi-functional apparatus according to claim 6, wherein said apparatus comprises one lock for a pivotably movable member and one window release lock.

8. A method for controlling operation of multiple electrically-actuated functions with a single electromagnetic device, said method comprising the steps of:

(a) energizing said electromagnetic device to rotate an armature shaft;

(b) engaging a first intermittent rotary motion mechanism having a driven interfacing surface with a first end of said armature shaft during a first rotation positional range of said armature shaft; and (c) engaging a second intermittent rotary motion mechanism having a driven interfacing surface with a second end of said armature shaft during a second portion rotation positional range of said armature shaft.

9. A method according to claim 8, wherein said first and second intermittent rotary motion mechanisms are alternatively engaged.

* * * * *